US012679966B2

(12) United States Patent
Nerkar et al.

(10) Patent No.: US 12,679,966 B2
(45) Date of Patent: Jul. 14, 2026

(54) PERFORMANCE AND PROCESSING OF POLYVINYL BUTYRAL (PVB)/ACRYLIC COMPOSITES

(71) Applicant: Rohm and Haas Company, Collegeville, PA (US)

(72) Inventors: Manoj Nerkar, Royersford, PA (US); Hailan Guo, Warrington, PA (US)

(73) Assignee: ROHM AND HAAS COMPANY, Collegeville, PA (US)

( * ) Notice: Subject to any disclaimer, the term of this patent is extended or adjusted under 35 U.S.C. 154(b) by 1100 days.

(21) Appl. No.: 17/626,620

(22) PCT Filed: Jul. 13, 2020

(86) PCT No.: PCT/US2020/041780
§ 371 (c)(1),
(2) Date: Jan. 12, 2022

(87) PCT Pub. No.: WO2021/015974
PCT Pub. Date: Jan. 28, 2021

(65) Prior Publication Data

US 2022/0380589 A1    Dec. 1, 2022

Related U.S. Application Data

(60) Provisional application No. 62/877,369, filed on Jul. 23, 2019.

(51) Int. Cl.
*C08L 33/12* (2006.01)
*C08L 29/14* (2006.01)

(52) U.S. Cl.
CPC .............. *C08L 29/14* (2013.01); *C08L 33/12* (2013.01); *C08L 2207/20* (2013.01); *C08L 2207/53* (2013.01)

(58) Field of Classification Search
CPC ...... C08L 29/14; C08L 33/12; C08L 2207/20; C08L 2207/53; C08K 2003/265; C08K 2003/326; C08K 3/013; C08K 3/26
See application file for complete search history.

(56) References Cited

U.S. PATENT DOCUMENTS

2006/0173105 A1*  8/2006  Griffin .................... C08L 27/06
                                                                524/35
2018/0298620 A1    10/2018  Pailler et al.

FOREIGN PATENT DOCUMENTS

DE          4202948 A1     8/1993
EP          0543794 A1     5/1993
WO    WO-2014014076 A1 *   1/2014    .............. C08K 3/22

* cited by examiner

*Primary Examiner* — Kumar R Bhushan
(74) *Attorney, Agent, or Firm* — Warner Norcross + Judd LLP

(57) ABSTRACT

A composition and a method for preparing a polymer composite article. The composition comprises (A) a polyvinyl butyral (PVB) polymer in an amount of from 10 to 90 wt. %. The composition also comprises (B) a filler in an amount of from 10 to 90 wt. %. Further, the composition comprises (C) an acrylic polymer additive in an amount of from greater than 0 to 10 wt. %, the acrylic polymer additive selected from acrylic copolymers having a weight average molecular weight of at least 4,000,000 Da and a core-shell acrylic additive having a crosslinked core and a shell comprising an acrylic homopolymer or copolymer. The ranges for components (A)-(C) are based on the total weight of components (A), (B) and (C) in the composition.

9 Claims, 2 Drawing Sheets

PERFORMANCE AND PROCESSING OF POLYVINYL BUTYRAL (PVB)/ACRYLIC COMPOSITES

FIELD OF THE INVENTION

The present invention generally relates to a composition and, more specifically, to a composition for preparing a polyvinyl butyral/acrylic composite article, to methods of preparing the composition and the polymer composite article therewith, and to the polymer composite article formed thereby.

DESCRIPTION OF THE RELATED ART

Polyvinyl butyral (PVB) is a polymer known in the art for its strong binding and flexibility. PVB is capable of adhering to many types of materials and is commonly used as an interlayer for automobile windshields. Discarded windshields also provide a supply of PVB that can be recycled and repurposed.

The strong bonding and adhesiveness of PVB, however, can lead to issues with processability and performance, particularly when the PVB is melt processed.

When used with high levels of fillers, PVB is very sticky and adheres surface of melt processing equipment. For example, PVB sticks to the hot metal surfaces making it difficult to process.

Even with high levels of fillers, plasticized PVB also lack sufficient rigidity and can bend under its own weight. Additionally, PVB can deform easily when weight is applied, resulting in surface indentations Traditional processing aids, such as lubricating waxes, stearic acid, silicone oil, and silicone spray, individually or in combination, failed to significantly reduce the stickiness of PVB compositions.

BRIEF SUMMARY OF THE INVENTION

The present invention provides a composition for preparing a polymer composite article. The composition comprises (A) a polyvinyl butyral (PVB) polymer in an amount of from 10 to 90 wt. %. The composition also comprises (B) a filler in an amount of from 10 to 90 wt. %. Further, the composition comprises (C) an acrylic polymer additive in an amount of from greater than 0 to 10 wt. %, the acrylic polymer additive selected from acrylic copolymers having a weight average molecular weight of at least 4,000,000 Da and a core-shell acrylic additive having a crosslinked core and a shell comprising an acrylic homopolymer or copolymer. The ranges for components (A)-(C) are based on the total weight of components (A), (B) and (C) in the composition.

A method of preparing the composition is also provided. The method of preparing the composition comprises combining the (A) PVB polymer, the (B) filler, and the (C) acrylic polymer additive, thereby preparing the composition.

Further, a method for preparing a polymer composite article is provided by the present invention. The method comprises preparing the polymer composite article from the composition. In addition, a polymer composite article formed in accordance with the method is also provided.

DETAILED DESCRIPTION OF THE INVENTION

Figure 1A:
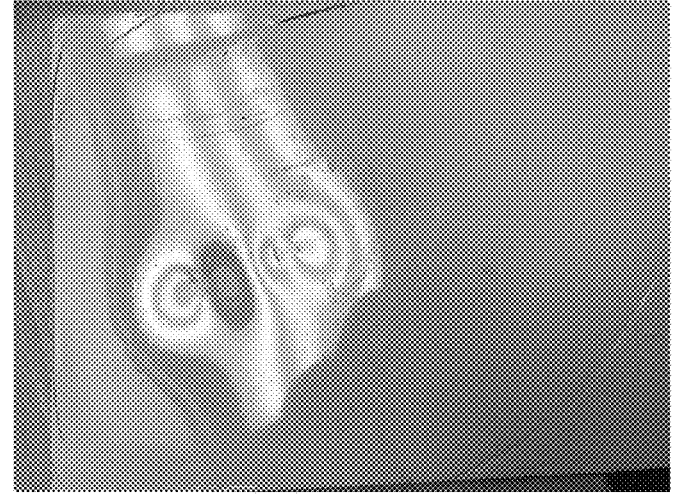
FIGS. 1A and 1B show the results of the indentation/deformation test for the Comparative Example and Example 2 according to an embodiment of the present invention, respectively.

The present invention provides a composition for preparing a polymer composite article. The polymer composite article has excellent physical properties and is suitable for myriad end use applications, as described below. A method of preparing a polymer composite article and the polymer composite article formed thereby are also provided and described below.

The composition for preparing a polymer composite article comprises: (A) a PVB polymer in an amount of from 10 to 90 wt. %; (B) a filler in an amount of from 10 to 90 wt. %; and (C) an acrylic polymer additive in an amount of from greater than 0 to 10 wt. %, wherein the acrylic polymer additive is selected from an acrylic copolymer having a weight average molecular weight of at least 4,000,000 Da and a core-shell acrylic additive having a crosslinked core and a shell comprising an acrylic homopolymer or copolymer; each based on the total weight of components (A), (B) and (C) in the composition.

Component (A) PVB Polymer

The composition further comprises (A) a polyvinyl butyral (PVB) polymer. The polymer may form all or a part of a continuous phase in the composition for preparing the polymer composite article and the composite article prepared therefrom.

The (A) PVB polymer may have a weight average molecular weight ranging from 25,000 to 750,000 Da.

Recycled PVB polymers may comprise plasticizers. When virgin PVB is used as the (A) PVB polymer, plasticizers as known in the art may be added. The plasticizers may be present in an amount up to 50 parts by weight per 100 parts by weight of the PVB polymer.

The (A) PVB polymer is preferably halogen-free, i.e., the PVB polymer contains less than 0.01 wt. % halogen with respect to the weight of the PVB polymer.

In certain embodiments, the (A) PVB polymer consists essentially of a PVB polymer. By consist essentially of, it is meant that the (A) PVB polymer can include one or more additional polymers other than a PVB polymer so long as such additional polymers can be processed along with the (A) PVB polymer to form the polymer composite article. In yet other embodiments, the (A) PVB polymer consists of a PVB polymer. When the (A) PVB polymer does not consist of a polyvinyl, the (A) PVB polymer typically includes a PVB polymer in an amount of at least 50, alternatively at least 60, alternatively at least 65, alternatively at least 70, alternatively at least 75, alternatively at least 80, alternatively at least 85, alternatively at least 90, alternatively at least 95, alternatively at least 96, alternatively at least 97, alternatively at least 98, alternatively at least 99, wt. % based on the total weight of the (A) PVB polymer utilized in the composition.

When the (A) PVB polymer comprises a polymer other than and in addition to a PVB polymer, the (A) PVB polymer may further comprise polyolefins (e.g. polyethylenes (PE), polypropylenes (PP), polybutylenes, poly (1-butene), polyisobutene, poly(1-pentene), poly(3-methyl-1-pentene), poly(4-methyl-1-hexene), poly(5-methyl-1-hexene), etc.), polycycloolefins, polyamides (e.g. nylon 6, nylon 66, etc.), polyesters (e.g. polyethylene terephthalates (PET), polybutylene terephthalates (PBT), polytrimethylene terephthalates (PTT), polyethylene naphthalates (PEN), liquid crystalline polyesters, polycyclohexylenedimethylene terephthalate (PCT), polylactic acid (PLA), etc.), polycarbonates, polystyrenes, polyimides, polyphenylene sulfides; polyphenylene ethers; polyamideimides, polyoxymethylenes (POM), ethylene vinyl alcohol (EVOH), ethylene vinyl acetate (EVA), ethylene alkyl (meth)acrylates, ethylene propylene diene monomer (EPDM), ethylene propylene rubber (EPR), acrylics (e.g. polymethylmethacrylate), celluloses (e.g. triacetylcellulose, diacetylcellulose, cellophane, etc.), polyurethanes, polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); polysulfones; polyethersulfones; polyphenylsulfones; polyetherimides; resol-type; urea (e.g. melamine-type); ABS (acrylonitrile butadiene styrenic polymer), fluorinated resins, such as polytetrafluoroethylenes; thermoplastic vulcanizates; styrenics; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The (A) PVB polymer may further comprise an elastomer. Non-limiting examples of elastomers include styrene-butadiene rubber, polyether urethane rubber, polyester urethane rubber, butyl rubber, nitrile rubber, chloroprene rubber (neoprene), polyacrylate rubber, ethylene acrylate rubber, ethylene-propylene rubber, ethylene-propylene-diene rubber, ethylene propylene diene monomer (EPDM), ethylene propylene rubber (EPR), fluorosilicone rubber, fluorocarbon rubber, perfluorinated elastomer, styrene butadiene rubber, chlorosulfonated polyethylene, polyisoprene rubber, polysulfide rubber, ethylene acrylate rubber, epichlorohydrine rubber, perfluoroelastomer (e.g. Kalrez™), polysulfide rubber, chlorinated polyethylene (e.g. chlorinated polyethylene comprising up to 40 weight percent chlorine), and combinations thereof.

Regardless of the (A) PVB polymer utilized, the (A) PVB polymer can comprise virgin polymer and/or recycled polymer. The recycled polymer, if utilized, may be sourced from industrial production streams, as well as from post-industrial and/or post-consumer sources. The selection of the (A) PVB polymer, as well as any ratio of virgin polymer to recycled polymer, if utilized in concert, is typically a function of cost and desired properties of the polymer composite article formed therewith. PVB can be readily recycled from sources such as automobile windshields, where the PVB forms an interlayer in the glass laminate. Preferably, the (A) PVB polymer is a recycled PVB.

The (A) PVB polymer may be present in the composition in an amount of from 10 to 90, alternatively from 20 to 90, alternatively from 25 to 80, alternatively from 30 to 70, alternatively from 35 to 55, alternatively from 40 to 50, weight percent based on the total weight of the composition. In specific embodiments, it is desirable to minimize the relative amount of the (A) PVB polymer in the composition, which may reduce overall cost thereof depending on selection, so long as desirable properties of the polymer composite article formed therewith are maintained or obtained. One of skill in the art understands that the amount of the (A) PVB polymer may be modified for this purpose, including a balance of cost and resulting properties, as well as the presence or absence of other optional components, as described below.

Component (B) Filler

The composition comprises (B) a filler. The (B) filler may form a discontinuous phase in the composition for preparing the polymer composite article and the composite article so prepared. The (B) filler is not limited and may be, for example, a reinforcing filler, an extending filler, a thermally conductive filler, an electrically conductive filler, a flame retarding filler, an acid accepting filler, a rheologically modifying filler, a lignocellulosic filler, a coloring filler, a mineral filler, a glass filler, a carbon filler, or a combination thereof. The selection of the (B) filler is typically a function of the polymer composite article to be formed with the composition and the end use applications of the polymer composite article.

The (B) filler may be untreated, pretreated, or added in conjunction with an optional filler treating agent, described below, which when so added may treat the (B) filler in situ or prior to incorporation of the (B) filler in the composition. The (B) filler may be a single filler or a combination of two or more fillers that differ in at least one property such as type of filler, method of preparation, treatment or surface chemistry, filler composition, filler shape, filler surface area, average particle size, and/or particle size distribution.

The shape and dimensions of the (B) filler is also not specifically restricted. For example, the (B) filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the (B) filler utilized, the selection of other components included within the composition, and the end use application of the polymer composite article formed therewith.

Non-limiting examples of fillers that may function as reinforcing fillers include reinforcing silica fillers such as fume silica, silica aerogel, silica xerogel, and precipitated silica. Fumed silicas are known in the art and commercially available; e.g., fumed silica sold under the name CAB-O-SIL by Cabot Corporation of Massachusetts, U.S.A.

Non-limiting examples fillers that may function as extending or reinforcing fillers include quartz and/or crushed quartz, aluminum oxide, magnesium oxide, silica (e.g. fumed, ground, precipitated), hydrated magnesium silicate, magnesium carbonate, dolomite, silicone resin, wollastonite, soapstone, kaolinite, kaolin, mica muscovite, phlogopite, halloysite (hydrated alumina silicate), aluminum silicate, sodium aluminosilicate, glass (fiber, beads or particles, including recycled glass, e.g. from wind turbines or other sources), clay, magnetite, hematite, calcium carbonate such as precipitated, fumed, and/or ground calcium carbonate, calcium sulfate, barium sulfate, calcium metasilicate, zinc oxide, talc, diatomaceous earth, iron oxide, clays, mica, chalk, titanium dioxide (titania), zirconia, sand, carbon black, graphite, anthracite, coal, lignite, charcoal, activated carbon, non-functional silicone resin, alumina, silver, metal powders, magnesium oxide, magnesium hydroxide, magnesium oxysulfate fiber, aluminum trihydrate, aluminum oxyhydrate, coated fillers, carbon fibers (including recycled carbon fibers, e.g. from the aircraft and/or automotive industries), poly-aramids such as chopped KEVLAR™ or Twaron™, nylon fibers, mineral fillers or pigments (e.g. titanium dioxide, non-hydrated, partially hydrated, or hydrated fluorides, chlorides, bromides, iodides, chromates, carbonates, hydroxides, phosphates, hydrogen phosphates, nitrates, oxides, and sulfates of sodium, potassium, magnesium, calcium, and barium); zinc oxide, antimony pentoxide, antimony trioxide, beryllium oxide, chromium oxide, lithopone, boric acid or a borate salt such as zinc borate, barium metaborate or aluminum borate, mixed metal oxides such as vermiculite, bentonite, pumice, perlite, fly ash, clay, and silica gel; rice hull ash, ceramic and, zeolites, metals such as aluminum flakes or powder, bronze powder, copper, gold, molybdenum, nickel, silver powder or flakes, stainless steel powder, tungsten, barium titanate, silica-carbon black composite, functionalized carbon nanotubes, cement, slate flour, pyrophyllite, sepiolite, zinc stannate, zinc sulphide), and combinations thereof. Alternatively the extending or reinforcing filler may be selected from the group consisting of calcium carbonate, talc and a combination thereof.

Extending fillers are known in the art and commercially available; such as a ground silica sold under the name MIN-U-SIL by U.S. Silica of Berkeley Springs, WV. Suitable precipitated calcium carbonates include Winnofil™ SPM from Solvay and Ultra-pflex™ and Ultra-pflex™ 100 from SMI.

When the (B) filler comprises a thermally conductive filler, the (B) filler may be both thermally conductive and electrically conductive. Alternatively, the (B) filler may be thermally conductive and electrically insulating. A thermally conductive filler may also have other beneficial properties, such as, but not limited to, a reinforcing filler, an extending filler, or another property as described above. The thermally conductive filler may be selected from, but not limited to, the group consisting of aluminum nitride, aluminum oxide, aluminum trihydrate, aluminum oxyhydrate, barium titanate, barium sulfate, beryllium oxide, carbon fibers, diamond, graphite, magnesium hydroxide, magnesium oxide, magnesium oxysulfate fiber, metal particulate, onyx, silicon carbide, tungsten carbide, zinc oxide, coated fillers, and a combination thereof.

When the (B) filler comprises the thermally conductive filler, the thermally conductive filler may comprise a metallic filler, an inorganic filler, a meltable filler, or a combination thereof. Metallic fillers include particles of metals, metal powders, and particles of metals having layers on the surfaces of the particles. These layers may be, for example, metal nitride layers or metal oxide layers. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces. Inorganic fillers are exemplified by onyx; aluminum trihydrate, aluminum oxyhydrate, metal oxides such as aluminum oxide, beryllium oxide, magnesium oxide, and zinc oxide; nitrides such as aluminum nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point from 50° C. to 250° C. The meltable filler may be a eutectic alloy, a non-eutectic alloy, or a pure metal. Many suitable meltable fillers are commercially available.

The (B) filler may comprise a lignocellulosic-based filler. The lignocellulosic-based filler comprises, alternatively consists essentially of, alternatively consists of, a lignocellulosic material. Typically, the lignocellulosic-based filler consists of the lignocellulosic material. The lignocellulosic-based filler, as well as the lignocellulosic material, may comprise any matter derived from any plant source. When the lignocellulosic-based filler consists essentially of or consists of lignocellulosic material, the lignocellulosic material may also include some water or moisture content, although the lignocellulosic material, as well as the lignocellulosic-based filler, is typically dry, i.e., does not contain any free moisture content but for that which may be associated with the relative humidity in an environment in which the lignocellulosic-based filler is prepared, derived, formed, and/or stored. The same is typically true for other species of the (B) filler, but is noted in regard to lignocellulosic-based fillers as lignocellulosic materials generally include some water content as harvested/prepared prior to any drying or end use.

The lignocellulosic-based filler typically comprises carbohydrate polymers (e.g. cellulose and/or hemicellulose), and may further comprise an aromatic polymer (e.g., lignin). The lignocellulosic-based filler is typically a natural lignocellulosic material, i.e., is not synthetically derived. For example, the lignocellulosic-based filler is typically derived from wood (hardwood, softwood, and/or plywood). Alternatively or in addition, the lignocellulosic-based filler may comprise lignocellulosic material from other non-wood sources, such as lignocellulosic material from plants, or other plant-derived polymers, for example agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof.

Specific examples of suitable hardwoods from which the lignocellulosic-based filler may be derived include, but are not limited to, ash, aspen, cottonwood, basswood, birch, beech, chestnut, gum, elm eucalyptus, maple, oak, poplar, sycamore, and combinations thereof. Specific examples of suitable softwoods from which the lignocellulosic-based filler may be derived include, but are not limited to, spruce, fir, hemlock, tamarack, larch, pine, cypress, redwood, and combinations thereof. Combinations of different hardwoods, combinations of different softwoods, combinations of hardwood(s) and softwood(s), or combinations of one or both of hardwoods and softwoods with plywood, may be utilized together as the lignocellulosic-based filler. The lignocellulosic-based filler may be virgin, recycled, or a combination thereof.

The lignocellulosic-based filler may have any form and size, e.g., from nanometer to millimeter particle size. For example, the lignocellulosic-based filler may comprise a powder, a pulp, a flour, sawdust, a fiber, a flake, a chip, a shaving, a strand, a scrim, a wafer, a wool, a straw, a particle, or any combination thereof. The lignocellulosic-based filler may be formed via a variety of techniques known to one of skill in the art, typically as a function of the form thereof. For example, the lignocellulosic-based filler can be prepared by comminuting logs, branches, industrial wood residue, rough pulpwood, etc. The lignocellulosic-based filler may be comminuted to a desired particle size. For example, the lignocellulosic-based filler may be comminuted with any convenient equipment, such as a hammer mill, which results in the lignocellulosic-based filler having a particle size suitable for use in mixing processes. The desired particle size is typically selected by one of skill in the art based on the particular mixing process utilized and desired properties of the polymer composite article. By particle size, it is meant the dimensions of the lignocellulosic-based filler, regardless of shape, and includes, for example, dimensions associated with the lignocellulosic-based filler when in the form of fibers. As known in the art, lignocellulosic-based fillers may be pelletized, or otherwise in the form of pellets, which may substantially maintain shape and dimension when incorporated into the composition or which may form smaller particles in the composition.

Alternatively, the (B) filler may comprise a polysaccharide filler, which may comprise both a cellulose or hemicellulose derivative and optionally lignin. Alternatively, the polysaccharide filler may consist essentially of, alternatively consist of polymers consisting of subunits of B-D glucose. Alternatively, the polysaccharide filler may comprise starches, pullulans, pectins, dextrans, alginates or animal derived polysaccharides such as chitin and chitosan.

In certain embodiments, the (B) filler is selected from a lignocellulosic filler, a mineral filler, a glass filler, a carbon filler, a pigment, and combinations thereof. In certain embodiments, the (B) filler consists essentially of a lignocellulosic filler, a mineral filler, a glass filler, a carbon filler, a pigment, and combinations thereof. In specific embodiments, the (B) filler consists of a lignocellulosic filler, a mineral filler, a glass filler, a carbon filler, a pigment, and combinations thereof. When the (B) filler comprises the mineral filler, the mineral filler is typically selected from calcium carbonate ($CaCO_3$) and/or talc. In such embodiments, the mineral filler may be a reinforcing filler, an extending filler, or both in the composition and the plastic composite article formed therewith. The selection of the (B) filler is typically a function of the polymer composite article to be formed with the composition and the end use applications of the polymer composite article. Preferably, the (B) filler is a mineral filler. More preferably, the (B) filler is a mineral filler selected from calcium carbonate and talc.

Regardless of the selection of the (B) filler, the (B) filler may be treated or untreated.

The (B) filler is present in the composition in an amount of from 10 to 90, alternatively from 10 to 80, alternatively from 20 to 75, alternatively 30 to 70, and alternatively from 45 to 65, weight percent based on the total weight of the composition. All end points and subranges from 10 to 90 are included and disclosed herein. In certain other embodiments, the (B) filler is present in the composition in an amount of from 20 to 50 weight percent based on the total weight of the composition. Alternatively, the (B) filler may be present in an amount of from 65 to 85, alternatively 70 to 80, weight percent based on total weight of the composition for certain applications, such as wood-plastic composites or mineral filled composites. Alternatively, for certain applications, it is desirable to maximize the relative amount of the (B) filler in the composition, which reduces overall cost thereof, so long as desirable properties of the polymer composite article formed therewith are maintained or obtained. One of skill in the art understands that the amount of the (B) filler may be modified for this purpose, including a balance of cost and resulting properties, as well as the presence or absence of other optional components, as described below.

Further still, the (B) filler may comprise a blend of different types of fillers. For example, when the composition is utilized to prepare a wood plastic composite, the (B) filler may comprise a blend of a lignocellulosic filler and a reinforcing filler, e.g. talc and/or calcium carbonate. Further, specific fillers, such as those for fire resistance, can also be included to customize or selectively control or improve properties of the polymer composite article. In such embodiments, the composition may comprise, for example, up to 50 weight percent lignocellulosic filler, up to 20 weight percent mineral filler, and optionally some lesser amount of other types of filler, each based on the combined weight of components (A), (B) and (C).

Component (C) Acrylic Polymer Additive

The composition further comprises (C) an acrylic polymer additive.

In certain embodiments, the (C) acrylic polymer additive is selected from an acrylic copolymer having a weight average molecular weight of at least 4,000,000 Da. Preferably, the acrylic copolymer has a weight average molecular weight of at least 5,000,000 Da, more preferably at least 6,000,000 Da, and even more preferably, at least 7,500,000 Da. The acrylic polymer additive may have a weight average molecular weight of up to 25,000,000 Da, such as, for example, up to 20,000,000 Da or up to 15,000,000 Da.

The acrylic copolymer may be the reaction product of one or more monomers selected from alkyl (meth)acrylate monomers. Examples of alkyl (meth)acrylate monomers include, but are not limited to alkyl (meth)acrylates comprising linear or branched alkyl groups with 1 to 12 carbon atoms, such as methyl (meth)acrylate, ethyl (meth)acrylate, propyl (meth)acrylate, butyl (meth)acrylate, ethyl hexyl acrylate, and iso-octyl acrylate. Preferably, the alkyl (meth) acrylate monomers are selected from methyl (meth)acrylate and butyl (meth)acrylate monomers. More preferably, the alkyl (meth)acrylate monomers are selected from methyl methacrylate and butyl acrylate monomers.

The acrylic copolymer may further comprise units derived from additional monomers, such as, for example, styrenic monomers or a functional monomers. As used herein, a "functional monomer" is a monomer that comprises an additional functional group, such as a functional group that would allow the acrylic copolymer to form a covalent or hydrogen bond to the PVB polymer or other components in the composition. One example of a functional monomer is 2-[(2-methyl-1-oxo-2-propenyl)oxy]ethyl 3-oxobutanoate. Other examples of functional monomers include monomers that have a hydroxyl group.

In certain embodiments, the acrylic copolymer the reaction product of monomers selected from methyl methacrylate monomers, butyl acrylate monomers, styrenic monomers, and combinations thereof. For example, the acrylic copolymer may be the reaction product of a combination of methyl methacrylate monomers and butyl acrylate monomers or from a combination of methyl methacrylate monomers, butyl acrylate monomers, and styrenic monomers.

In other embodiments, the acrylic copolymer is the reaction product of monomers selected from methyl methacrylate monomers, butyl acrylate monomers, and a functional monomer, preferably 2-[(2-methyl-1-oxo-2-propenyl)oxy] ethyl 3-oxobutanoate.

Preferably, the acrylic copolymer comprises at least 30 wt. % of units derived from methyl methacrylate monomers, such as, at least 40 wt. %, at least 50 wt. %, at least 60 wt. %, at least 70 wt. % or at least 80 wt. %, based on the total weight of the acrylic copolymer.

Preferably, the acrylic copolymer comprises at least 5 wt. % of units derived from butyl acrylate monomers, such as, at least 10 wt. %, at least 15 wt. %, or at least 20 wt. %, based on the total weight of the acrylic copolymer.

In other embodiments, the (C) acrylic polymer additive comprises a core-shell acrylic additive having a crosslinked core and a shell comprising an acrylic homopolymer or copolymer.

The crosslinked core may be the reaction product of one or more monomers selected from the group consisting of alkyl (meth)acrylates with one or more crosslinking monomers, graft-linking monomers or combinations thereof. According to certain embodiments the amount of units derived from alkyl (meth)acrylate monomers may range of 95 to 99.9 wt. % of the core and the amount of units derived from the cross-linking monomer and/or graft linking monomers may range from 0.1 to 5 wt. %.

According to at least one embodiment, the crosslinked core comprises greater than 95 to 99.9 wt. % of units derived from one or more monomers selected from the group consisting of alkyl (meth)acrylate monomers. All individual values and subranges from 95 to 99.9 wt. % are included herein and disclosed herein; for example, the amount of units derived from one or more alkyl (meth)acrylate monomers can be from a lower limit of 95, 95.5, 96, 96.5, 97, 975, 98, 98.5, 99, or 99.5 wt. % to an upper limit of 95.3, 95.8, 96.3, 96.9, 97.5, 98, 98.7, 99.4 or 99.9 wt. %. For example, the amount of units derived from one or more alkyl (meth) acrylate monomers may be in the range of from 95 to 99.9 wt. %, or in the alternative, the amount of units derived from one or more alkyl (meth)acrylate monomers may be in the range of from 95 to 97.5 wt. %, or in the alternative, amount of units derived from one or more alkyl (meth)acrylate monomers may be in the range of from 97.8 to 99.9 wt. %, or in the alternative, the amount of units derived from one or more alkyl (meth)acrylate monomers may be in the range of from 96.5 to 97.9 wt. %.

The crosslinked core may comprise from 0.1 to 5 wt. % of units derived from a cross-linking monomer, graft-linking monomer, or combination thereof. All individual values and subranges from 0.1 to 5 wt. % are included herein and disclosed herein; for example, the amount of units derived from cross-linking monomer, graft-linking monomer, or combination thereof can be from a lower limit of 0.1, 0.7, 1.2, 1.9, 2.6, 3.1, 3.7, 4.4, or 4.9 wt. %, to an upper limit of 0.2, 0.8, 1.4, 2.1, 2.7, 3.3, 3.8, 4.5 or 5 wt. %. For example, the amount of units derived from cross-linking monomer, graft-linking monomer, or combination thereof may be in the range of from 0.1 to 5 wt. %, or in the alternative, the amount of units derived from cross-linking monomer, graft-linking monomer, or combination thereof may be in the range of from 0.5 to 2.5 wt. %, or in the alternative, the amount of units derived from cross-linking monomer, graft-linking monomer, or combination thereof may be in the range of from 1.0 to 4.0 wt. %, or in the alternative, the amount of units derived from cross-linking monomer, graft-linking monomer, or combination thereof may be in the range of from 0.3 to 3.5 wt. %.

The shell of the core-shell acrylic additive comprises one or more layers which may comprise from 98.5 to 100 wt. % units derived from one or more monomers selected from the group consisting of alkyl (meth)acrylate, styrenic monomers, and combinations thereof The one or more layers of the shell may comprise from 0 to 1.5 wt. % of units derived from one or more chain transfer agents.

In at least one embodiment, the shell of the core-shell acrylic additive comprises one or more layers each of which comprises from 98.5 to 100 wt. % units derived from one or more monomers selected from the group consisting of alkyl (meth)acrylate, styrenic monomers, and combinations of two or more thereof. All individual values and subranges from 98.5 to 100 wt. % are included herein and disclosed herein; for example, the amount of units derived from one or more monomers selected from the group consisting of alkyl (meth)acrylate, styrenic monomers, and combinations of two or more thereof can be from a lower limit of 98.5, 98.7, 98.9, 99.1, 99.3, 99.5, 99.7, or 99.9 wt. % to an upper limit of 98.6, 98.8, 99, 99.2, 99.4, 99.6, 99.8, or 100 wt. %. For example, the amount of units derived from one or more monomers selected from the group consisting of alkyl (meth)acrylate, styrenic monomers, and combinations of two or more thereof may be in the range of from 98.5 to 100 wt. %, or in the alternative, the amount of units derived from one or more monomers selected from the group consisting of alkyl (meth)acrylate, styrenic monomers, and combinations of two or more thereof may be in the range of from 98.5 to 100 wt. %, or in the alternative, the amount of units derived from one or more monomers selected from the group consisting of alkyl (meth)acrylates, and styrenic monomers, and combinations of two or more thereof may be in the range of from 98.5 to 100 wt. %, or in the alternative, the amount of units derived from one or more monomers selected from the group consisting of alkyl (meth)acrylates, styrenic monomers, and combinations of two or more thereof may be in the range of from 98.5 to 100 wt. %, or in the alternative, the amount of units derived from one or more monomers selected from the group consisting of alkyl (meth)acrylate, styrenic monomers, and combinations of two or more thereof may be in the range of from 98.5 to 99.6 wt. %, or in the alternative, the amount of units derived from one or more monomers selected from the group consisting of alkyl (meth)acrylates, styrenic monomers, and combinations of two or more thereof may be in the range of from 96.5 to 100 wt. %.

According to at least one embodiment, each of the one or more layers of the shell comprises from 0 to 1.5 wt. % units derived from one or more chain transfer agents. All individual values and subranges from 0 to 1.5 wt. % are included herein and disclosed herein; for example, the amount of units derived from one or more chain transfer agents can be from a lower limit of 0, 0.2, 0.4, 0.6, 0.8, 1, 1.2, or 1.4 wt. % to an upper limit of 0.1, 0.3, 0.5, 0.7, 0.9, 1.1, 1.3, or 1.5 wt. %. For example, the amount of units derived from one or more chain transfer agents may be in the range of from 0 to 1.5 wt. %, or in the alternative, the amount of units derived from one or more chain transfer agents may be in the range of from 0 to 0.75 wt. %, or in the alternative, the amount of units derived from one or more chain transfer agents may be in the range of from 0.75 to 1.5 wt. %, or in the alternative, the amount of units derived from one or more chain transfer agents may be in the range of from 0.3 to 1.2 wt. %.

The alkyl of the alkyl (meth)acrylate used in the cross-linked core or shell may be a linear or branched alkyl group with 1 to 12 carbon atoms. Exemplary monomers include butyl acrylate, ethyl hexyl acrylate, ethyl acrylate, methyl methacrylate, butyl methacrylate, and iso-octylacrylate.

Examples of cross-linking and/or graft-linking monomers useful in the crosslinked core or shell of the core-shell acrylic additive may include, for example, butanediol diacrylate, butanediol dimethacrylate, ethylene glycol diacrylate, ethylene glycol dimethacrylate, divinyl benzene, diethylene glycol diacrylate, diethylene glycol dimethacrylate, diallyl maleate, allyl methacrylate, diallyl phthalate, triallyl phthalate, trimethylolpropane triacrylate, trimethylolpropane trimethacrylate blends thereof and combinations of two or more thereof.

The core-shell acrylic additive may be produced by any conventional process such as multi-stage emulsion polymerization.

Typically, the (C) acrylic polymer additive serves as a process aid in the composition and the polymer composite article. The (C) acrylic polymer additive may serve other purposes, in addition to or alternatively to serving as a process aid, e.g. to modify physical or mechanical properties of the composition and the polymer composite article.

Generally speaking, the (C) acrylic polymer additive may allow various advantages to be realized. When the composition is melt processed, the (C) acrylic polymer additive may improve the processability of the polymer composition by reducing the amount of sticking to the processing equipment. The (C) acrylic polymer additive may also improve the rigidity and strength of the composite products.

The composition may further comprise additional components, such as, for example, a colorant (e.g., pigments, dyes), a blowing agent (e.g., physical blowing agent and/or chemical blowing agent), a UV stabilizer, antioxidants, process aids (e.g., internal process aids, external process aids), preservatives, biocides (e.g., fungicides, herbicides, pesticides, antimicrobials), flame retardants/smoke suppressants, impact modifiers, heat stabilizers, and lubricants. These components are known in the art and can be used according to conventional practice.

A method for preparing a polymer composite article is also provided. The method comprises preparing the polymer composite article from the composition. In certain embodiments, the method further comprises forming the composition. The composition is formed by combining at least component the (A) PVB polymer, the (B) filler, and the (C) acrylic polymer additive, along with any optional components present in the composition.

The components of the composition may be combined in any order and via any suitable manner. In certain embodiments, for example, the (A) PVB polymer may be melted prior to, during, and/or after formation of the composition. For example, the (A) PVB polymer may be heated prior to and/or during combining the components such that the (B) filler and the (C) acrylic polymer additive are combined with a melted form of the (A) PVB polymer. The (B) filler and the (C) acrylic polymer additive may be combined with the melted form of the (A) PVB polymer in any order, e.g. individually, sequentially, together, or simultaneously. Alternatively, however, the (A) PVB polymer may be combined with the (B) filler and the (C) acrylic polymer additive prior to heating or melting the (A) PVB polymer such that the (A) PVB polymer is in solid and unmelted or unsoftened form when preparing the composition. Alternatively, the (B) filler and the (C) acrylic polymer additive may be combined and heated, then added to the (A) PVB polymer in solid or liquid form when preparing the composition.

In certain embodiments, the (B) filler and the (C) acrylic polymer additive and at least one other component (e.g., one or more of the additional components described above) may be combined to give a mixture, and the mixture is combined with the (A) PVB polymer (and any other additional components) to give the composition. The (B) filler and the (C) acrylic polymer additive may be combined by, blending or mixing. Combining the (B) filler and the (C) acrylic polymer additive may further comprise heating, e.g., to bind the (C) acrylic polymer additive to the (B) filler. Optionally, the resulting combination of (B) filler and (C) acrylic polymer additive may be compacted before being pelletized or powdered. Combining the (B) filler and the (C) acrylic polymer additive may be performed in a separate process or may be integrated into an existing (e.g., extrusion) process for making a polymer composite article in a pre-mixing step. In the pre-mixing step, the components may be blended together before feeding into an extruder, e.g., all or a portion of the (B) filler and the (C) acrylic polymer additive (prepared as described above) and (B) the polymer, and one or more additional components, may be mixed in the pre-mixing step and thereafter fed to an extruder.

The composition for preparing the polymer composite article may be formed under mixing or shear, e.g. with suitable mixing equipment. For example, the composition may be formed in a vessel equipped with an agitator and/or mixing blades, or a lab two roll mill. The vessel may be, for example, an internal mixer, such as a Banbury, Sigma (Z) Blade, or Cavity Transfer style mixer. Alternatively or in addition, the composition may be formed in or processed by an extruder, which may be any extruder, e.g. a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the composition described herein.

As introduced above, the method also comprises preparing the polymer composite article from the composition for preparing the polymer composite article. The composition may be formed, e.g. in the vessel, and subsequently removed from the vessel to form the polymer composite article with separate equipment. Alternatively, the same equipment may be utilized to prepare the composition and subsequently form the polymer composite article. For example, the composition may be prepared and/or mixed in an extruder, and the extruder may be utilized to prepare the polymer composite article with the composition. Alternatively, the polymer composite article may be formed via molding, e.g. with an injection or compression molding process. The composition may be formed in situ in the mold, or formed independently and disposed in the mold once formed. Alternatively still, the polymeric composite article may be a film/sheet. In such embodiments, the composition can be formed or disposed in a vessel, optionally under mixing at an elevated temperature, and disposed in or on equipment to prepare the film/sheet from the composition. Such equipment and techniques for preparing films/sheets from compositions, particularly those including thermoplastics like the (A) PVB polymer of the composition, are well known in the art.

In certain embodiments, preparing the polymer composite article from the composition further comprises forming the composition into a desired shape. The desired shape depends on end use applications of the polymer composite article. One of skill in the art understands how dies for extrusion and molds for molding may be selected and created based on the desired shape of the polymer composite article.

In certain embodiments, the method is performed continuously or semi-continuously in an extruder, such as a twin screw extruder (in which the screws are concurrently rotated, partially or fully intermeshing, alternatively counter rotated aligned either tangentially or partially or fully inter-meshing). In one embodiment, the (C) acrylic polymer additive is disposed in the extruder concurrently with the (B) filler and the (A) PVB polymer. Alternatively, the (C) acrylic polymer additive may be disposed in the extruder after melting the (A) PVB polymer and before adding the (B) filler. Alternatively, the (C) acrylic polymer additive may be disposed in the extruder after the (B) filler and the (A) PVB polymer and before the polymer composite article exits the extruder. Alternatively, the (B) filler may be disposed in the extruder concurrently with the (C) acrylic polymer additive, where they are heated to effect surface treatment of the (B) filler with the (C) acrylic polymer additive, then the (A) PVB polymer is disposed in the extruder to give a mixture and the temperature increased to a temperature suitable for compounding the mixture and forming the polymer composite article. The extruder may have one or more zones, such as 1 to 3, or 3 to 8, or 1 to 12, zones, where starting materials can be added. The zones may be heated at different temperatures.

The polymer composite article of the invention is not limited and may be customized for myriad end use applications and industries. By way of example only, the polymer composite article may be utilized in or as automotive components or applications, including under hood components and parts and interior components, e.g. floor mats; consumer products and applications, industrial or commercial products and applications, aerospace products and applications, transportation products and applications, aircraft products and applications, electronics products and applications, residential or commercial building and construction products and applications, e.g. decking, railing, siding, fencing, window framing, flooring, etc.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

INDUSTRIAL APPLICABILITY

Without wishing to be bound by theory, it is thought that the (C) acrylic polymer additive may provide one or more benefits to the polymer composites and/or processes for making them described herein.

EXAMPLES

In the Examples, 100% recycled PVB in the form of pellets was used (SharkPelletsC2c from Shark Solutions, Belgium). Calcium carbonate was used as the filler in a ratio of 70:30 calcium carbonate to PVB. Acrylic polymer additives were added as shown in Table 1 below. Examples 2 and 3 comprise the same composition and were used to show the reproducibility of the results. Each of the acrylic polymer additives was acquired from The Dow Chemical Company. An additional sample using Paraloid™ K-175, which is an acrylic polymer additive having a Mw less than 4,000,000 Da was attempted, but stuck to the equipment and could not be processed.

TABLE 1

| Example | PVB (wt. %) | CaCO$_3$ (wt. %) | Acrylic Polymer Additive (wt. %) | Acrylic Polymer Additive |
|---|---|---|---|---|
| CE | 30 | 70 | 0 | None |
| 1 | 28.3 | 66.0 | 5.7 | Paraloid ™ KM 334 |
| 2 | 28.3 | 66.0 | 5.7 | Surecel ™ T-60 |
| 3 | 28.3 | 66.0 | 5.7 | Surecel ™ T-60 |
| 4 | 28.3 | 66.0 | 5.7 | Surecel ™ 467 |

Figure 1B:
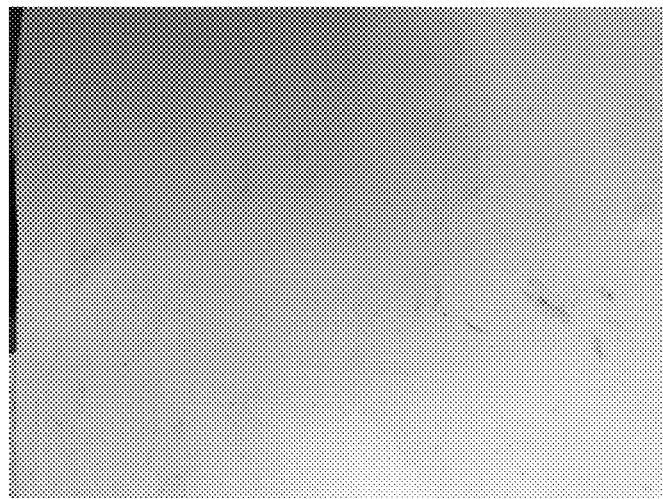

The samples were milled at 170° C. for 5 minutes on an electric Collin Roll mill with a 0.3 mm gap. Then the milled sheet was compression molded to form a 3.2 mm thick plaque at 175° C. The plaques were used for indentation/deformation and rigidity testing. For indentation/deformation testing, a wheeled office chair was placed on the center of a plaque for 16 hours. As shown in FIGS. 1A and 1B, the plaque according to an embodiment of the present invention demonstrated no indentation after 16 hours, whereas the Comparative Example exhibited significant deformation.

Figure 2:
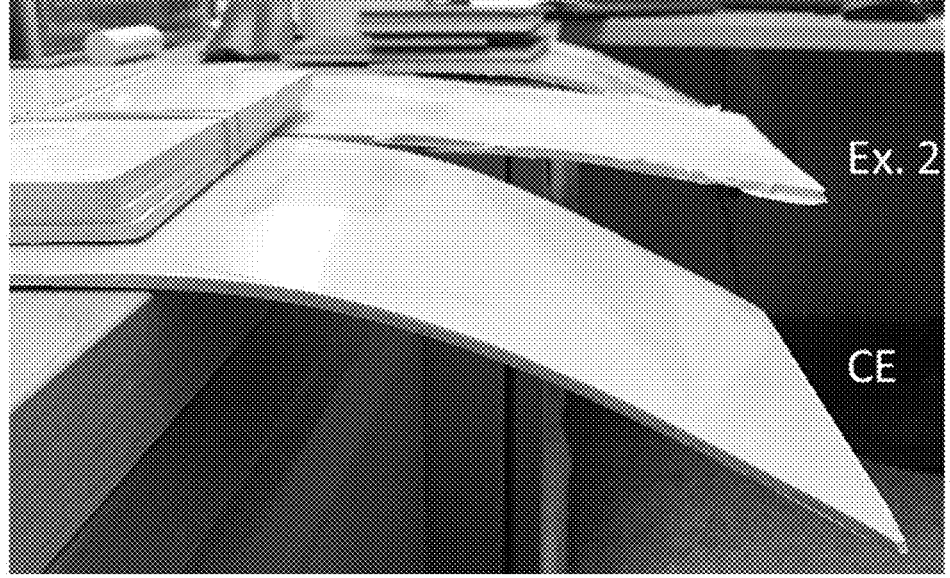
FIG. 2 shows the results of rigidity testing for the Comparative Example and Example 2 according to an embodiment of the present invention.

The compositions according to the present invention also demonstrated significantly improved rigidity compared to the Comparative Example (CE). As shown in FIG. 2, plaques placed on the edge of a table such that half of the length of the plaque extended beyond the edge of the table. As can be seen in FIG. 2, the Comparative Example fell under its own weight and Example 2 according to an embodiment of the present invention was significantly more rigid. Differences between the sagging of the Comparative Example and Example 2 were noticeable after 20 minutes. The sample of Example 2 did not bend after 24 hours.

Differential scanning calorimetry (DSC) was performed on pressed plaques that were melt processed via a 2 roll mill. DSC was performed according to the conditions set forth below in Table 2. Data was collected from the second heating cycle.

TABLE 2

| DSC Conditions |
|---|
| Equilibrate to −90° C. |
| 1$^{st}$ ramp to 150° C. @ 10° C./min |
| Quench to −90° C. |
| 2$^{nd}$ ramp to 150° C. @ 10° C./min |
| End Cycle |

Table 3 summarizes the DSC data collected on the samples.

TABLE 3

| | Glass Transition Temperature (Tg) (° C.) | | |
|---|---|---|---|
| Example | Start | Inflection Point | End |
| Neat PVB | 6.2 | 16.1 | 28.1 |
| 1 | 8.7 | 24.5 | 35.2 |
| 2 | 18.3 | 30.2 | 45.5 |
| 3 | 16.5 | 30.5 | 46.2 |
| 4 | 19.6 | 31.6 | 46.1 |

In addition to the improved properties, the Examples according to embodiments of the present invention also exhibited improved processability by sticking less to the equipment and providing uniform mixing/dispersion of filler. Addition of acrylic copolymer and core shell additive increased the glass transition temperature substantially leading to prevent sticking and improving handling and processing.

DEFINITIONS AND USAGE OF TERMS

Unless otherwise indicated by the context of the specification, all amounts, ratios and percentages are by weight, and all test methods are current as of the filing date of this disclosure. The articles "a", "an" and "the" each refer to one or more. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The term "composition," as used herein, includes material(s) which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities may be incorporated into and/or within the polymer.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend.

What is claimed is:

1. A composition for preparing a polymer composite article, said composition comprising:
   (A) a polyvinyl butyral (PVB) polymer in an amount of from 10 to 90 wt. %;
   (B) a filler in an amount of from 10 to 90 wt. %;
   (C) an acrylic polymer additive in an amount of from greater than 0 to 20 wt. %, wherein the acrylic polymer additive is selected from an acrylic copolymer having a weight average molecular weight of at least 5,000,000 Da or a core-shell acrylic additive having a crosslinked core and a shell comprising an acrylic homopolymer or copolymer;
      wherein said (C) acrylic polymer additive comprises an acrylic copolymer that is the reaction product of methyl methacrylate monomers and butyl acrylate monomers; and
      wherein the acrylic copolymer comprises at least 60 wt. % of units derived from methyl methacrylate monomers based on the total weight of the acrylic copolymer;
   each based on the total weight of components (A), (B) and (C) in said composition.

2. The composition of claim 1, wherein the acrylic polymer additive has a weight average molecular weight of at least 6,000,000 Da.

3. The composition of claim 2, wherein the acrylic polymer additive has a weight average molecular weight of at least 7,500,000 Da.

4. The composition of claim 1, wherein said (B) filler is selected from mineral fillers and organocellulosic fillers.

5. A method of preparing a polymer composite article, said method comprising: preparing the polymer composite article from the composition of claim 1.

6. A polymer composite article prepared from the method of claim 5.

7. The composition of claim 1, consisting essentially of components (A)-(C).

8. The composition of claim 1, consisting of components (A)-(C) and optionally one or more additives selected from a colorant, a blowing agent, a UV stabilizer, an antioxidant, a process aid, a preservative, a biocide, a flame retardant, an impact modifier, a heat stabilizer, and/or a lubricant.

9. The composition of claim 1, wherein component (A) comprises PVB in an amount of at least 95 wt. % based on the total weight of component (A).

* * * * *